(12) United States Patent
Pettersson et al.

(10) Patent No.: US 12,466,287 B2
(45) Date of Patent: Nov. 11, 2025

(54) TRUE ELECTRIC VEHICLE CHARGING PRICE EVALUTION AND OPTIMIZATION

(71) Applicant: FORD GLOBAL TECHNOLOGIES, LLC, Dearborn, MI (US)

(72) Inventors: Lars Niklas Pettersson, Novi, MI (US); Jonathan Hair, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 276 days.

(21) Appl. No.: 18/309,907

(22) Filed: May 1, 2023

(65) Prior Publication Data
US 2024/0367547 A1 Nov. 7, 2024

(51) Int. Cl.
*B60L 58/12* (2019.01)
*B60L 53/66* (2019.01)

(52) U.S. Cl.
CPC ............. *B60L 58/12* (2019.02); *B60L 53/665* (2019.02); *B60L 2240/545* (2013.01); *B60L 2240/60* (2013.01); *B60L 2240/80* (2013.01)

(58) Field of Classification Search
CPC .. B60L 58/12; B60L 53/665; B60L 2240/545; B60L 2240/60; B60L 2240/80; B60L 2250/16; B60L 53/64; B60L 53/66; B60L 2240/72; B60L 2260/54; Y02T 10/70; Y02T 10/7072; Y02T 90/12; G06Q 30/0283
See application file for complete search history.

(56) References Cited

U.S. PATENT DOCUMENTS

| | | | |
|---|---|---|---|
| 8,406,948 B2 | 3/2013 | Wang et al. | |
| 11,567,503 B1 * | 1/2023 | Roy | ............... G05D 1/028 |
| 2014/0200793 A1 | 7/2014 | Dufford et al. | |
| 2016/0303992 A1 * | 10/2016 | Lovett | ............... B60W 20/13 |

(Continued)

FOREIGN PATENT DOCUMENTS

| | | | | |
|---|---|---|---|---|
| CN | 110871705 A | | 3/2020 | |
| EP | 2963388 B1 * | | 8/2021 | ........ B60L 11/1861 |

OTHER PUBLICATIONS

"Modern batteries and their management—Part I and Part II" N. Kularatna IECON 2010—36th Annual Conference on IEEE Industrial Electronics Society (2010, pp. 1-103). (Year: 2010).*

(Continued)

*Primary Examiner* — Kito R Robinson
*Assistant Examiner* — Tanya C Sienko
(74) *Attorney, Agent, or Firm* — Joseph Zane; Brooks Kushman P.C.

(57) ABSTRACT

A vehicle determines a current state of charge of the vehicle and a current battery temperature of a battery of the vehicle. The vehicle, based on at least the state of charge and battery temperature, determines a charge acceptance rate for the battery and determines if the acceptance rate meets at least one predefined parameter for charging. The vehicle finds at least one charging station within a predefined proximity for which one or more known charge provision characteristics allow the at least one predefined parameter to be met, responsive to the acceptance rate meeting the at least one predefined parameter, and displays a location of the at least one charging station.

18 Claims, 4 Drawing Sheets

(56) References Cited

U.S. PATENT DOCUMENTS

| | | | |
|---|---|---|---|
| 2017/0080809 A1* | 3/2017 | Lee | B60L 53/00 |
| 2018/0056803 A1* | 3/2018 | Hell | B60L 3/0069 |
| 2020/0055420 A1* | 2/2020 | Peer | B60L 53/62 |
| 2020/0101964 A1* | 4/2020 | Badger | B60W 20/13 |
| 2020/0341472 A1* | 10/2020 | Zenner | B60L 58/12 |
| 2022/0176841 A1 | 6/2022 | Moura et al. | |
| 2023/0028206 A1* | 1/2023 | Quint | B60L 53/305 |
| 2024/0195197 A1* | 6/2024 | Bennett | B60L 53/305 |
| 2024/0283272 A1* | 8/2024 | Ongyanco | H02M 3/158 |
| 2024/0428144 A1* | 12/2024 | Herron | G06Q 10/02 |
| 2025/0065768 A1* | 2/2025 | Raguse | B60L 53/68 |

OTHER PUBLICATIONS

"Pricing and Plans for EV charging" downloaded from The Wayback Machine Jan. 8, 2022 (downloaded Mar. 28, 2025) (Year: 2022).*

"Change my mind: after a point, range doesn't matter. Efficiency and charge rates do." accessed at www.reddit.com/r/electricvehicles/comments/zdv2vl/change_my_mind_after_a-point_range_doesnt_matter/ Listed as being "2 yr. ago" If the date is hovered over, it was posted Dec. 5, 2022. (Year: 2022).*

"Real-Time Overcharge Warning and Early thermal Runaway Prediction of Li—Ion Battery by Online Impedance Measurement" Lyu et al., IEEE Transactions on Industrial Electronics, vol. 69, No. 2, Feb. 2022 (Year: 2022).*

(https://www.effortlesselectric.com/2020/08/14) "What is Acceptance Rate and How Does it Affect Charging Speed?" G. Ohrstrom Aug. 14, 2020 (Year: 2020).*

"Temperature effect and thermal impact in lithium-ion batteries: A review" S. Ma et al., Progress in Natural Science: Materials International 28 (2018) 653-666 (Year: 2018).*

* cited by examiner

TRUE ELECTRIC VEHICLE CHARGING PRICE EVALUTION AND OPTIMIZATION

TECHNICAL FIELD

The illustrative embodiments generally relate to methods and apparatuses for true electric vehicle charging price evaluation and optimization.

BACKGROUND

Owners of electric vehicles have several options for obtaining power. A common method is to obtain power while parked at home, in which instance the price of power is relative to the power drawn from the grid at the home's electric rates. These rates may vary with peak and off-peak hours, but since the homeowner is also the one charging, it is relatively easy to strategically charge the vehicle.

The other primary option for charging is the use of charging points and stations, which often carry a cost. The cost can be per unit of time spent (e.g., per minute, per hour, etc.) or can vary with power drawn, time of day, source of power, etc. This can make it difficult to know the true cost of power relative to yield, as spending $10 in one instance does not necessarily produce remotely the same result as spending $10 in another instance.

SUMMARY

In a first illustrative embodiment, a vehicle includes one or more processors configured to determine a current state of charge of a battery of the vehicle and determine a current battery temperature of the battery of the vehicle. The one or more processors are also configured to. based on at least the state of charge and battery temperature, determine a charge acceptance rate for the battery and determine if the acceptance rate meets at least one predefined parameter for charging. The one or more pro further configured to find at least one charging station within a predefined proximity for which one or more known charge provision characteristics allow the at least one predefined parameter to be met, responsive to the acceptance rate meeting the at least one predefined parameter, and display a location of the at least one charging station.

In a second illustrative embodiment, a vehicle includes one or more process configured to determine a projected state of charge of a battery of the vehicle on at least one upcoming point along a planned route and determine a projected battery temperature of the battery of the vehicle at the at least one upcoming point. The one or more processors are also configured to, based on at least the state of charge and battery temperature, determine a charge acceptance rate for the battery at the at least one upcoming point and determine if the acceptance rate meets at least one predefined parameter for charging. Additionally, the one r more processors are configured to find at least one chargin ion within a predefined proximity to the at least one upcoming point for which one or more known charge provision characteristics allow the at least one predefined parameter to be met, responsive to the acceptance rate meeting the at least one predefined parameter, and display a location of the at least one charging station.

In a third illustrative embodiment, a vehicle includes one or more processors configured to determine a projected state of charge of a battery of the vehicle on at least one upcoming pont along a planned route and determine a projected battery temperature of the battery of the vehicle at the at least one upcoming point. The one or more processors are also configured to, based on at least the state of charge and battery temperature, determine a charge acceptance rate for the battery at the at least one upcoming point and determine if the acceptance rate meets at least one predefined parameter for charging. Additionally, the one or more processors are configured to find at least one charging station within a predefined proximity to the at least one upcoming point for which one or more known charge provision characteristics allow the at least one predefined parameter to be met, responsive to the acceptance rate meeting the at least one predefined parameter, and display a location of the at least one charging station. Also, the one of more processor are configured to determine that the vehicle is charging at one of the at least one charging stations, monitor the acceptance rate while the vehicle is charging, and automatically terminate charging if the acceptance rate falls below at least a first threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory; hard disk drives, etc. Communication between systems and processes may include use of, for example, BLUETOOTH®, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While charging stations are beginning to become more prevalent for electric vehicle owners to use to recharge their vehicles, the charges for power can vary wildly in terms of the true price when calculated as a function of utility (miles gained per price spent) for the driver. This can be due to a variety of factors, not the least of which is that these stations do not have consistent pricing and charging services.

For example, many stations elect to use a price per time model. Because electricity itself may not be a sufficiently expensive commodity to warrant charging simply for power drawn, and because vehicles may take longer to charge than filling a conventional gas vehicle would to fill, station owners have different models for EV charging pricing.

Further, vehicle charge rates may vary significantly based on state of charge (SOC), heat, load on the grid, and from model to model. While a vehicle with a 20 gallon gas tank will generally take a linear amount of time to fill, relative to a vehicle with a 10 gallon tank (e.g., twice as long), two vehicles both seeking to obtain an equal amount of electric charging can take vastly different amounts of time to obtain the same amount of power.

Vehicles that are heated to high battery temperatures and which have significantly full batteries draw power at a much lower rate than a cooler, lower-charged vehicle. From a station owner's perspective, it may not be desirable to charge both drivers the same rate for obtaining charging, as the first driver may occupy the charger for much longer than the second driver. With fuel, this is not a problem, as the 20 gallon tank user will use the pump twice as long as the 10 gallon tank user, but will also pay twice as much to obtain twice as much fuel.

From a vehicle owner's perspective, this is also problematic, both in terms of time wasted for slow charging and not knowing the cost per mile in a manner comparable to that calculable based on gasoline driving. That is, the owner would prefer to charge at times when the charging will be fast, both to save time and money if the charging cost is per minute. At the same time, the owner may not realize that a charge rate is slow (relative to what it could be) and may spend excessive time and money waiting for a nominal charging result.

Compounding the issue is the fact that, at least in certain instances, many vehicles charging at once can slow the rate of charge to all vehicles based on load on the grid. So a crowded station in a popular charging area can result in even longer wait times, which again use both time and money from a vehicle owner's perspective. The types of power provided (renewable vs conventional) as well as peak timing can result in a substantial variance in charging times and costs.

All of this complicates the ability of an owner to determine the true price or value of charging in a given scenario. Presumably most owners would prefer to spend the least amount of money possible and the least amount of time possible when charging. For some, one may take precedence over the other if a balance must be struck, but it is rare that people enjoy wasting either.

The illustrative embodiments provide methods for vehicle charging that can show a driver a real price for charging in terms of, among other things, an instant price per mile (or other distance). This allows for a fast evaluation in terms of price spent on a planned trip. The system can also inform the driver of factors affecting the charging time and price, as well as make recommendations to increase charging efficiency (in price or time). Drivers can strike a balance or display a preference for cost or time, but the two often go hand-in-hand in terms of efficiency in any event.

In many instances the charging is linear or near linear in terms of cost and time, and those are somewhat "ideal" conditions for charging. Use of rapid charging typically comes at an increased cost experienced through payment for charge obtained (as opposed to time), but even time-based payment of charging can be efficient when the battery is readily accepting charge. Users who want to save time can use rapid charging at a higher cost, but do so when the charge can be fully received, otherwise the vehicle will tend to sit longer at the rapid charging point to "top off" the battery, defeating the purpose of rapid charging. Users who want to save money can elect to pay per unit of time (e.g., per minute), but also want to do so when they can fully utilize the time spent in terms of miles gained, especially if they pay for a fixed block of time.

In both instances (rapid charging and conventional charging), the fall-off in terms of miles gained can be substantial when the battery is not in a state to receive the full value of the charge. For example, a driver may spend $12 and 30 minutes to obtain 200 miles of charge (as an illustrative example) or spend $7 and 50 minutes for the similar charge (200 miles) if using slower charging. In both of these examples (which are illustrative only), the first example demonstrates capability when the battery can fully receive charge.

If the charging were impaired, however, due to, for example, high battery temperatures, SOC nearly full, etc., the driver may spend $7 and 80 minutes to gain 120 miles of range using rapid charging, or $12 and 80 minutes using conventional charging to gain 120 miles of range. In each cases, the overall cost per mile or time spend per mile gained is greatly increased.

In the rapid charging scenario, the price per mile tends to remain consistent, but the time nearly triples, which completely defeats the purpose of rapid charging. This is because the battery cannot receive the full charge being rapidly delivered at the rate it could in a more optimal scenario. In the conventional charging scenario, the time spent increases substantially as does the cost per mile, which is undesirable on two fronts. A user, who does not understand this paradigm, and who may not precisely track their energy gained vs time vs cost vs energy spend may have little appreciation that they could be spending nearly twice as much time and money (or even more) for the same amount of utility when they sub-optimally charge. The illustrative embodiments can both improve the ability of systems to recommend correct charging locations and types, as well as improve the overall throughput of already overcrowded charging stations by creating a system whereby people who intelligently charge spend significantly less time charging and thereby provide greater charging access for others. Further, in at least certain circumstances, vehicles can automatically stop charging when efficiency drops below thresholds.

Figure 1:
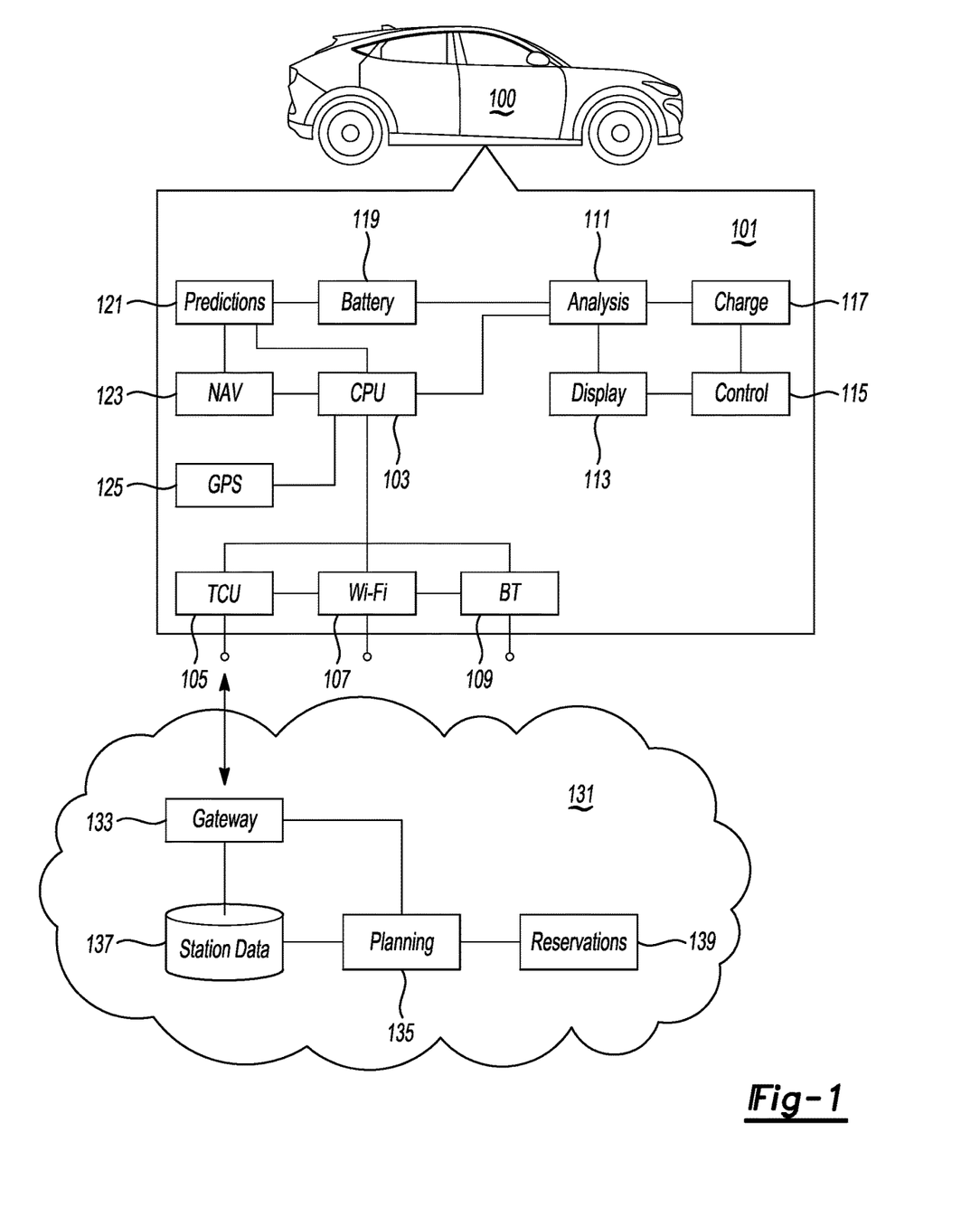
FIG. 1 shows an illustrative example of a system for intelligent charging.

FIG. 1 shows an illustrative example of a system for intelligent charging. In this example, the vehicle 100 is an electric vehicle with an onboard computing system 101. The computing system includes one or more processors 103 that control and effectuate various onboard processes. The vehicle 100 may also include various communication channels, such as, for example, a cellular modem and telematics control unit (TCU) 105, a Wi-Fi transceiver 107 and a BLUETOOTH® transceiver 109.

The TOU 105 can be used for backend cloud 131 communication, for example, through a gateway 133, so that the vehicle 100 can, among other things, obtain updated charging planning, remote station usages and prices, and reservation assistance. The BLUETOOTH® transceiver 109 can provide communication with a user device to provide charging feedback. which can also be displayed in the vehicle 100 on display 113.

When the vehicle is traveling and/or when the vehicle begins charging, an analysis process 111 can determine the price of charging. When the vehicle is traveling, the analysis process can determine the spot-price of charging based on the current states of the vehicle (SOC, temperatures, local prices and pricing schemes, etc.). When the vehicle is actually charging, the determination is reasonably similar, except that the pricing is then known for that instance of charging.

A charge evaluation process 117 can determine the current rate of charge in terms of the charging point output, as well as the actual charge being obtained by the battery 119. Wi-Fi transceiver may also be used for communication with the charging point and/or station, to obtain information such as, for example, expected rates of charge, pricing, etc. A control process 115 can actively cease charging when it becomes too inefficient (as defined, for example, by a given driver).

For example, a driver may pay for 30 minutes of charging by reserving a 30-minute time slot. For the first 15 minutes, the vehicle may obtain charge at a reasonable rate, such as (by way of illustration only) $0.05 per mile. The vehicle may also add 5 miles of charge per minute. As the battery fills and if heat is rising, at minute 16 the charge cost may drop to $0.08 per mile with a projected final charge cost (over the remaining 15 minutes) of $0.12 per mile. Even though the user has already paid for the remaining 15 minutes, the effective price per mile has increased because the charging rate may have slowed. Accordingly, the user will essentially add (in this example) 75 miles of charge in the first 15 minutes and around 30 miles of charge in the last 15 minutes. Despite the user having paid for the full 30 minutes, the user may decide to terminate the charging session when, for example, the charging price reaches $0.10 per mile. This will be because the user may have obtained around 80% of the total possible charge but only spent approximately 66% of the total possible time. The tradeoff, which is illustratively noted as 20 additional miles for 10 additional minutes of charging, may not be worth the remaining time spent, even if the full cost must be paid.

Further, station owners may be willing to discount unused time if a user leaves early when another vehicle is waiting, to effectively increase overall charge time value for the station—e.g., the user gets a 50% discount on time, and the station obtains 150% value on time because a new vehicle starts charging paying 100% of the time cost. That increases the throughput as well, reducing infrastructure strain resulting from too few charging stations.

The control process 115 can negotiate discounts, if any, with the station via Wi-Fi 107. This can include, for example, receiving indication of any discounts and/or notifying the station of a desire to disconnect to see if discounts could be made available by the station providing the remaining time to a new reservation slot. Stations may also find value in reducing overall load on the grid during peak charging times, such as rush hour, and so may also be incentivized to provide a discount to users who leave early.

While the vehicle is traveling, the analysis process 111 can determine predicted charging costs and efficiencies based on the current state of the battery. This can be combined with data from a prediction engine 121, which can use navigation data 123 and vehicle GPS 125 coordinates to determine local stations, local prices and efficiency of usage. Users who have a longer route, which may require at least one charge, can benefit from this process because the prediction process may look ahead along the route to determine areas where efficient charging may be obtained at reasonable prices. Modeling can provide the expected SOC and heat of the battery at various points along a route, which can be used to calculate the predicted rate of charge at those points.

Since unlike with a gas vehicle, electric vehicles can often charge at destinations, drivers may have a primary goal of simply reaching a destination (or returning home, at a minimum) on a current charge. Thus, the users may only want to charge if they need the power to reach a destination that includes charging, such as a home location. The process can account for this need and determine efficient (least time and/or money) charging that allows the vehicle to return to a home charger, where it can be charged at lower cost as the user desires.

The cloud 131 may also have remote processes and data that aid in decision-making. This can include planning processes 135 that can evaluate routes and possible charging plans for long journeys, where the availability of traffic projections, station data and other resources may make the cloud a faster computer for calculation and provide a result more accommodative of real time circumstances.

The cloud 131 may also have a station data database 137 that has pricing, current usages, historical usages, and other useful data about a variety of stations along a possible route. The vehicle 100 can obtain data for local stations, but if this data is continually updated (e.g., such as changing prices), it may be useful to also store the data in the cloud from which vehicles 100 can update when decision making is occurring. There may also be a backend reservation process 139 that assists a user in reservation planning for stations that allow reservations. This may also include the ability to negotiate with a station for a discount if an inefficient charging session is ended early.

Figure 2:
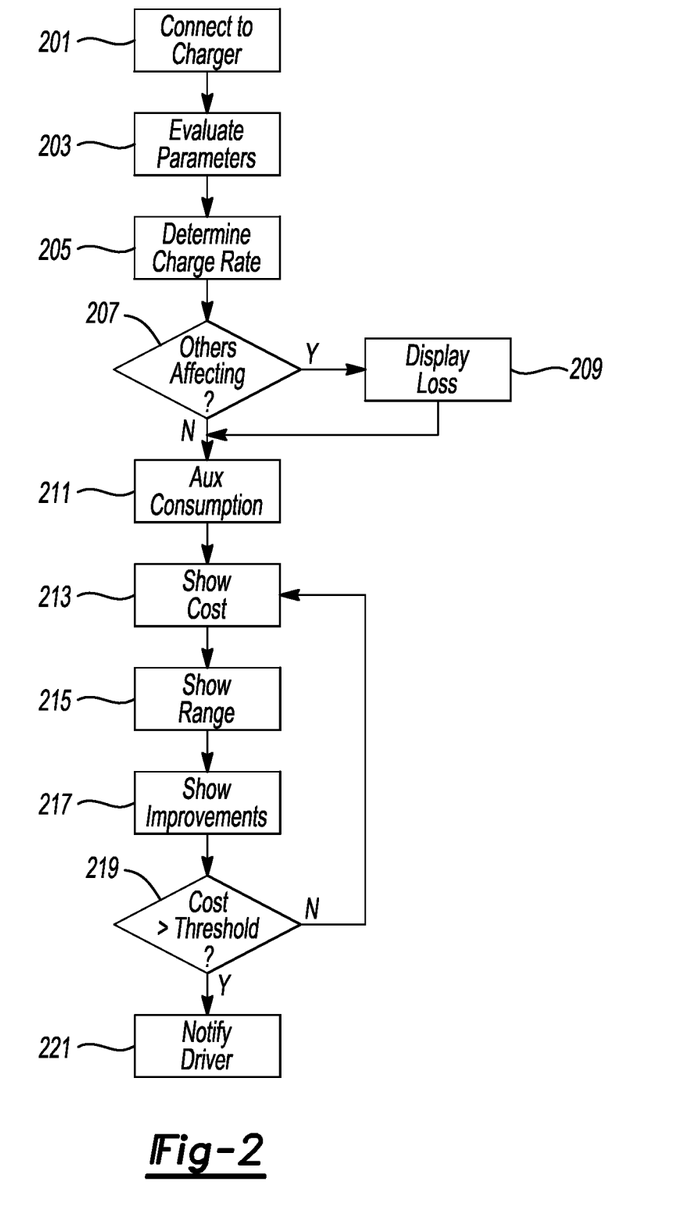
FIG. 2 shows an illustrative process for true price charging determination.

FIG. 2 shows an illustrative process for true price charging determination. In this example, the process detects when a vehicle is connected to the charger at 201. Using feedback from the vehicle, such as SOC and current battery temperatures, the process can evaluate parameters that affect charging at 203 to determine the current rate of charging at 205, which may be different than the maximum rate of charging available from the charger.

In this process, the system can also determine if other vehicles charging are having an effect on the charging capability at 207. This may be directly available from the station, or may be determined based on an advertised charging rate compared to a realized charging rate, when any vehicle-centric (SOC, heat) parameters are factored in. It is useful for a user to know this information, because if the user waited to efficiently charge, the user may have their own vehicle in a state ready to fully or nearly fully accept the promised charge. If an excessive load is reducing that charge, the user may want to seek another station to be more efficient. The loss realized from a lower-than-expected charging rate can be displayed at 209. This could affect the price a user pays if the user is paying for a time slot, or the amount of time a user will have to additionally stay in order to obtain an expected charge.

For example, if a user is experiencing charging 20% below target, the user could receive or request a discount of 20% for the time priced model. The user may also be informed that the 30-minute time slot reserved will be insufficient to gain the expected charge in case the user needs more time or needs to find another station. The relevant information can be displayed in the vehicle or on a mobile device.

The system can further determine the effect of auxiliary consumption on power usage at 211. This can show the effect on range and/or price. The display may also show recommended changes that can improve efficiency. Further, if the user is on a tight time schedule—e.g., has a 30-minute charging slot but the power is being delivered 10% below promised speed, the user may not have time to charge longer or find another station. The auxiliary power calculation can inform the user of what changes can be made to auxiliary usage to effectively change the power usage to deliver the same mileage on the 90% expected charge that will be delivered in the 30-minute window at the 10% below-promised charging rate. This can confirm for the user that they can reach a destination still without having to go search for another station to deliver the full charge.

The process can show the cost per mile of spot charging at 213. This could be, for example, a cost of $0.6 a mile. This display might also show some recommended auxiliary changes to lower the price at 217, if the user desires. The display may further show the historic price per mile paid by the user, so the user has a basis for comparison. A range/minute of range/cost display may also be provided at 215, so the user can see, for example, how much range is obtained per 5 minutes of charging or how much range is obtained for $1 of charging. All of this information is useful to the user in making decisions about efficiency, as well as allowing the user to determine, for example, whether waiting an additional 5 minutes carries sufficient net benefit.

If the cost exceeds a threshold at 219, which can be a user defined threshold, a historical average, a station average, a local average (from crowdsourced data), etc., the process may notify the driver at 221. This can include automatic termination protocol as discussed later herein, or simply notification to a driver that a preferred threshold has been exceeded. With the information presented on the display, such as cost per mile, range per minute, etc., the driver can make an information decision about whether to continue charging.

Figure 3:
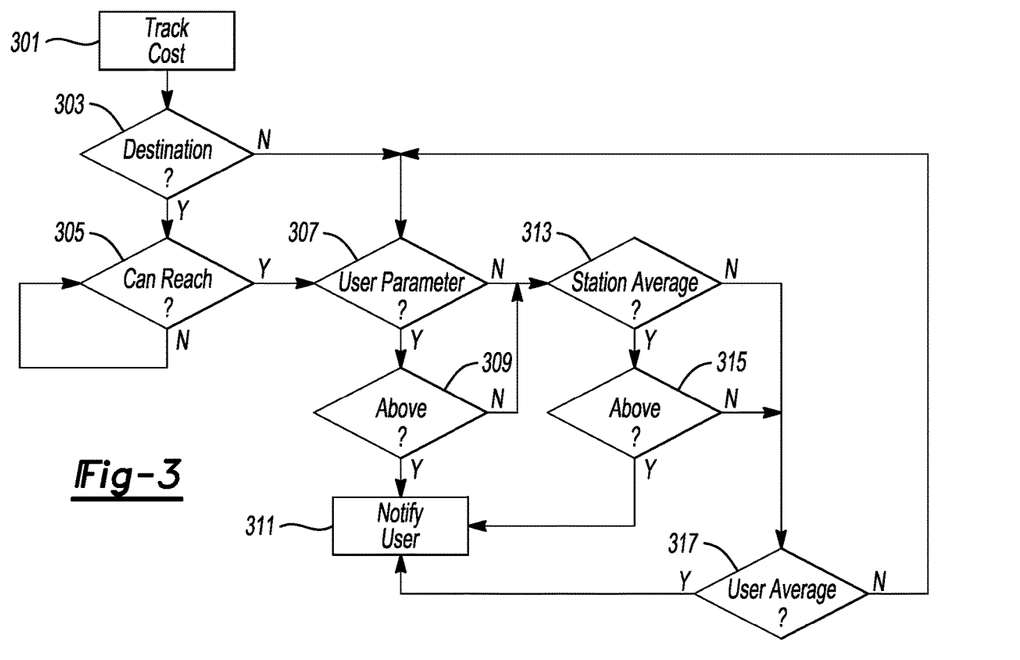
FIG. 3 shows an illustrative process for charging alerts.

FIG. 3 shows an illustrative process for charging alerts. This process is another process for tracking the cost of charging while charging, that can work in conjunction with processes such as those described with respect to FIG. 2.

In this example, the process tracks the cost of charging while the vehicle is charging at 301. This may be a generally static number under many circumstances, but if a power provision drops due to load on the grid, or the ability of the battery to accept charge at a consistent pace drops due to SOC or heat, for example, the cost of charge can move dramatically in a small period of time, relativistically speaking.

This process begins in this example by considering if there is an input destination at 303 and whether that destination can be reached on a current charge at 305. That is, because the increase in price may be relativistically large, but practically small, the user may prefer to have assurances of reaching a destination prior to being alerted to the charge pricing and/or having the vehicle take automatic action. This is not a necessary step, but if it occurs the user has assurances that they will be able to reach their destination before obtaining notifications about charging that may cause them to react. Another option would be to display the information in conjunction with notices, so that the user would appreciate that even though the price had risen 60%, from $0.05 per mile to $0.08 per mile, for example, the user still needed 20 miles of charging to reach a destination, which, for many users, will be worth the additional $0.60 of cost. Accordingly, in this example, the process waits until a user can reach a planned destination before evaluating whether notification to the user is appropriate.

Once the user can reach the destination, or if there is no destination, the process may examine a user parameter at 307 to determine if the current charging cost or efficiency is above the parameter at 309. If there is no parameter, or if the cost/efficiency is below the parameter, the process may also examine a station average for cost or efficiency at 313, if such data is available. This will let a user know if their experience is relative to the experience others have at this station—i.e., are they paying roughly the same price or getting the same efficiency that is experienced by other EV drivers at this charging station.

If there is no station average available, or if the user is experiencing cost and/or efficiency better than the station average at 315, the process may determine if user averages for cost and/or efficiency are being exceeded at 317. Since the vehicle can automatically calculate and store these averages (for days, weeks, months, life of vehicle, etc.) they should be available when programmed to be provided, without any need for a user to set any parameters. In any of the preceding instances, if the user is experiencing above average pricing or below average efficiency, the process may notify the user at 311 and/or take automatic action to cease charging. The process may also display one or all of the numbers available for comparison to the user while charging, so the user can see an ongoing display of historical charging rates vs real charging rates (or comparisons between user-defined values or crowd-sourced values).

Figure 4:
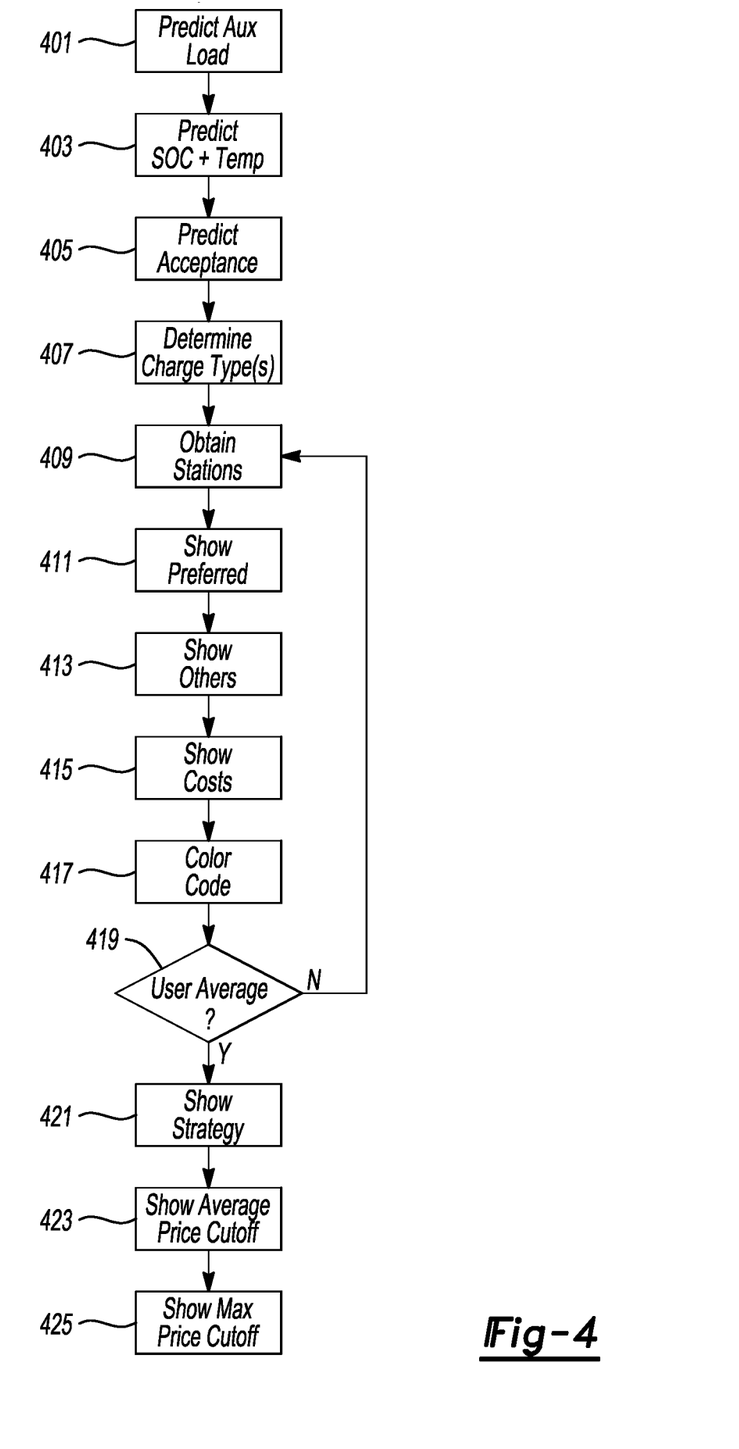
FIG. 4 shows an illustrative process for active charging feedback.

FIG. 4 shows an illustrative process for active charging feedback. In this example, the process can predict charge acceptance based on factors that effect battery charge acceptance. These include, for example, a prediction of auxiliary load at 401 and predicted drops in SoC and increases or decreases in battery temperature at 403.

Auxiliary load can be a function of current and/or historic usages. This can be combined with, for example, weather data, time of day, etc. User auxiliary usage may be a function of current usage (e.g. heating, ventilation, air conditioning (HVAC) usage, streaming audio/video, device charging, etc.). Feedback from connected devices can predict how much device charging will likely occur. HVAC usage may be a function of the driver/passengers present, exterior temperatures and a current interior cabin temperature. Long term modeling based on historic observations can be combined with immediate and predicted route factors (conditions along a route) to predict both power needs and how the SOC will be affected as the vehicle travels.

The SOC can be a function of the auxiliary load as well as power consumed in route travel for an upcoming route. This can include considerations of topography, traffic, speeds, etc. The temperature may be predicted or modeled at various locations and can be a function of battery usage (increasing heat) combined with cooling usage (decreasing both heat and SOC). Heat can also affect battery efficiency, and this can be accounted for in the SOC prediction by using heat projections to predict the effect travel and auxiliary usage will have on SOC when a battery is at a predicted temperature. A less-efficient battery state will lead to more power being used for other purposes.

Based on the variety of factors that affect SOC, the system can predict battery acceptance at 405, which is the rate the battery will accept a charge. This is also affected by heat, which can be used as part of the prediction, as well as any other factors that affect battery charge acceptance. By modeling this acceptance in a predictive manner, as well as modeling it for a present situation, the process can better determine when the optimal charging times may be on a route. This can also account for a total amount of charge expected to be gained, so that an SOC cutoff point (for optimal acceptance) is not necessarily reached halfway through a charge, dropping the efficiency and value of the remainder of a session.

The process can further determine what sorts of stations and pricing are locally available at 407, both for a present location and/or near points along a route where good acceptance levels are predicted. For example, a local station may require half-hour charging payment, and the current battery may only have 17 projected minutes of being a state of acceptable acceptance, so immediate local charging may not be recommended unless absolutely necessary to complete a route (e.g., no additional charging remains along the route). On the other hand, if the user needed 10 minutes worth of charge to complete the route and the local stations charged per minute, a stop for 10 minutes may be immediately recommended, since the battery is in a known state of good acceptance and there is a proximate station that accommodates the available acceptance without overrunning a changeover point to suboptimal acceptance.

At 407 the process can determine what charge types are appropriate (e.g., 15 minute or less time window, rapid charging, etc.) and then obtains local stations, if any, that match the parameters for availability at 409. This can also be done for later points along a route, based on predicted acceptance rates at those points.

The process may rank the stations based on which most closely fit user needs (e.g., minimum charge needed, maximum usage of acceptance) and show one or more preferred stations at 411 on a vehicle or mobile display. Other stations with less optimal matchings may also be shown at 413 in case the user has a desired to go to a different station (e.g., because of a credit or gift card, or brand preference). The projected statistics associated with charging may also be shown at 415, which can include, for example, price per mile, miles obtained per minute, etc.

The values may also be color coded at 417 with, for example, green values matching preferred stations or preferred parameters (e.g., effective cost or effective miles per minute). Yellow values could represent costs or efficiencies within a certain threshold of personal user averages, station or regional averages, etc. Red values could represent suboptimal outcomes. Users may also elect to avoid displaying certain results unless, for example, the user is in a dire power situation, wherein all stations may be displayed. Red, yellow, green is one non-limiting example of color-coding and is not constraining in any manner.

Determinations of whether a charging station meets any predefined parameters can be done in terms of a variety of factors. For example, if the user prefers a certain price per mile, there can be definitions of that price, as well as an acceptance rate necessary to obtain that price based on an amount of charge obtained per amount paid. If the user prefers to obtain a certain amount of additional mileage per unit of time, that amount can be predefined along with an acceptance rate necessary to obtain charge sufficient to travel the additional mileage relative to the amount of time required to obtain that charge. Stations can be considered for pricing and/or charge provision characteristics to ensure that a given station can meet the price or charge provision necessary to accomplish the goal.

Until the user arrives at a particular charging point at 419, the process can continue for the remainder of a journey, accommodating changes in power usage, temperatures, weather, traffic, etc., and updating stations displayed. Further, if stations are unavailable due to full reservations or available due to open reservations, that may affect whether the station is displayed as well.

Once the vehicle arrives at a charging point at 419, the process may show a strategy for charging based on the current projected acceptance at 421. For example, the vehicle may recommend charging for no more than a certain number of minutes to keep charging ongoing during a window of good acceptance. Or the vehicle may recommend rapid charging, metered charging, etc. If the vehicle knows the pricing model for the station, the model may be accommodated in the strategy.

This strategy may include, for example, recommended automatic cutoffs at an average price 423 and/or a maximum price 425. Either price could be user centric-defined based on the user experiences or defined by the user. Or the prices could be based on crowdsourced data—e.g., the average price cutoff is the average price for the region or station, the maximum price could be, for example, when price exceeds the bottom 80 percentile of pricing. A user can elect to automatically terminate charging at either point in advance or when the point is reached. Knowing the projected duration of a stay also allows the user to better plan arrival times and other aspects of a route. This technology could be combined with other planning, such as if the user was a rideshare driver—the rideshare application would know when the user would be ready to accept fares again, and could deliver fare offers accordingly, e.g., suspend the offers for the first 8 minutes of charging, and then provide the offers during the last 7 minutes of charging, depending on how much delay was acceptable to users using the rideshare application.

Figure 5:
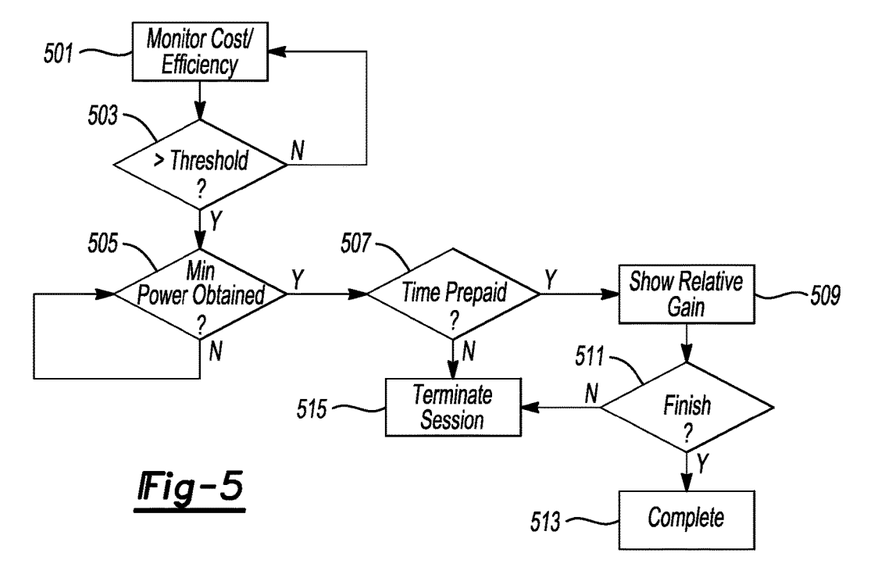
FIG. 5 shows an illustrative process for adaptive charging control.

FIG. 5 shows an illustrative process for adaptive charging control. In this example, the process monitors ongoing costs and efficiency at 501 to track whether they are remaining above expected efficiencies in one or both at 503. The user can define whether one or both should be considered, and what the expected values for each should be. The user may not have to specify the values explicitly, but could instead choose "average" value or "average value+N %" as examples.

Once the efficiency metric for one or both values has been breached by the current charging session (e.g., the charging has become time or cost inefficient), the process next determines if there is a minimum amount of power obtained at 505. This can be based on power needed to reach a destination or a projected destination. This can also be a function of time of day, for example, or user behavior. For example, if a user is traveling in the morning, the projected destination may be work. Travel in the afternoon may project to a destination of home. Travel without a significant stop may be indicative of an unknown destination, travel with at least one significant stop and some measure of return travel may be indicative of a return home. While the destination cannot be projected in all instances, it may still be possible to predict power needs and set minimum thresholds for many circumstances. In other instances, the minimum power thresholds could be, for example, the maximum number of miles needed to reach a power charging point in the longest reasonable distance around the current station—e.g., an eastern station is 10 miles, a western is 20 miles, a northern station is 15 miles and a southern station is 25 miles, so the process would "assume" that the travel is worst case, which is south in this simple example, and therefore would consider 25 miles of power to be the minimum, so that worst case the user could reach another station before running out of power.

Once the vehicle has minimum power to reach a destination or at least another station at 505, the process can determine if the user prepaid for the time at 507. That is, some people who prepay for a half hour may not want to relinquish their time, even if the efficiency is becoming poor. Other people may set the efficiency as a hard cutoff, preferring not to spend time charging inefficiently. The process can show, at 509, what the projected remaining gain is over the remaining time session, including relative gain (e.g., 50% less efficient) and aggregate gain (e.g., gain 25 more miles of travel for 5 minutes of charging). If the time is not prepaid, in this example, the session may terminate automatically at 515 on the basis of one or more efficiency parameters not being met. If the session is paid for and the owner does not have automatic shutoff configured, the process may inform the owner of the inefficiency and ask if they would like to continue charging at 511. If they elect to finish, the process will complete the charging at 513, although they could, of course, manually terminate the charging at any point thereafter.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
one or more processors configured to:
determine a projected state of charge of battery on at least one upcoming point along a planned route;
determine a projected battery temperature of the battery at the at least one upcoming point;
based on at least the projected state of charge and projected battery temperature, determine a charge acceptance rate for the battery at the at least one upcoming point;
determine if the acceptance rate meets at least one predefined parameter for charging;
responsive to the acceptance rate meeting the at least one predefined parameter, find at least one charging station within a predefined proximity to the at least one upcoming point for which one or more known charge provision characteristics allow the at least one predefined parameter to be met;
display a location of the at least one charging station; and
display a selectable option to make a reservation at the at least one charging station.

2. The vehicle of claim 1, wherein the at least one predefined parameter is defined in terms of a threshold range obtained per time spent charging, and wherein the acceptance rate meeting the parameter includes an acceptance rate sufficient to obtain a threshold charge per minute spent charging sufficient to obtain the threshold range.

3. The vehicle of claim 2, wherein the known charge provision characteristics include charge provision characteristics providing sufficient power per minute while the vehicle is charging such that, based on the projected acceptance rate, the vehicle obtains the threshold charge per minute.

4. The vehicle of claim 1, wherein the at least one predefined parameter is defined in terms of a threshold cost per unit of distance based on cost of obtained power projected to be necessary to travel the unit of distance and wherein the acceptance rate meeting the parameter includes an acceptance rate sufficient to achieve the threshold cost per unit of distance based on a given price per unit of time.

5. The vehicle of claim 4, wherein the known charge provision characteristics include charge provision pricing at or below the given price per unit of time.

6. The vehicle of claim 4, wherein the known charge provision characteristics additionally include charge provision characteristics providing sufficient power per minute to fulfil the acceptance rate.

7. The vehicle of claim 1, wherein the one or more processors are further configured to:
  determine the vehicle has connected to a charging point at a charging station;
  determine whether a provided charge, provided over the connection to the charging point, is at least equal to a projected charge reassociated with at least one of the charging station or the charging point as a power provision characteristic of the respective charging station or charging point, and
  alert a driver if the provided charge is below the projected charge.

8. The vehicle of claim 7, wherein the one or more processors are further configured to terminate the charging session automatically if the provided charge is more than a predefined threshold below the projected charge.

9. The vehicle of claim 1, wherein the one or more processors are further configured to:
  determine that the vehicle is charging;
  monitor the acceptance rate while the vehicle is charging; and
  alert a driver if the acceptance rate falls below at least a first threshold.

10. The vehicle of claim 9, wherein the first threshold is defined at least in part in terms of a threshold range obtained per time spent charging, and wherein the acceptance rate falling below the first threshold includes the acceptance rate becoming insufficient to obtain a threshold charge per minute spent charging sufficient to obtain the threshold range.

11. The vehicle of claim 9, wherein the first threshold is defined at least in part in terms of a threshold cost per unit of distance based on cost of obtained power projected to be necessary to travel the unit of distance and wherein the acceptance rate falling below the threshold includes an acceptance rate iusufficient to achieve the threshold cost per unit of distance based on a price per unit of time associated with the charging.

12. The vehicle of claim 9, wherein the monitoring the acceptance rate includes monitoring at least the current state of charge of the vehicle and the current battery temperature of a battery of the vehicle.

13. The vehicle of claim 1, wherein the one or more processors are further configured to:
  determine that the vehicle is charging;
  monitor the acceptance rate while the vehicle is charging; and
  automatically terminate charging if the acceptance rate falls below at least a first threshold.

14. The vehicle of claim 13, wherein the first threshold is defined at least in part in terms of a threshold range obtained per time spent charging, and wherein the acceptance rate falling below the first threshold includes the acceptance rate becoming insufficient to obtain a threshold charge per minute spent charging sufficient to obtain the threshold range.

15. The vehicle of claim 13, wherein the first threshold is defined at least in part in terms of a threshold cost per unit of distance based on cost of obtained power projected to be necessary to travel the unit of distance and wherein the acceptance rate falling below the threshold includes an acceptance rate insufficient to achieve the threshold cost per unit of distance based on a price per unit of time associated with the charging.

16. The vehicle of claim 1, wherein the one or more processors are further configured to:
  determine that the vehicle is charging;
  monitor the acceptance rate while the vehicle is charging; and
  automatically terminate charging if the acceptance rate falls below at least a first threshold.

17. The vehicle of claim 1, wherein at least one of either;
  the predefined parameter is defined in terms of a threshold range obtained per time spent charging, wherein the acceptance rate meeting the parameter includes an acceptance rate sufficient to obtain a threshold charge per minute spent charging sufficient to obtain the threshold range and wherein the known charge provision characteristics inciude charge provision characteristics providing sufficient power per minute while the vehicle is charging such that, based on the projected acceptance rate, the vehicle obtains the threshold charge per minute; or
  the at least one predefined parameter is defined in terms of a threshold cost per unit of distance based on cost of obtained power projected to be necessary to travel the unit of distance, wherein the acceptance rate meeting the parameter includes an acceptance rate sufficient to achieve the threshold cost per unit of distance based on a given price per unit of time, and wherein the known charge provision characteristics include at least one of charge provision pricing at or below the given price per unit of time or providing sufficient power per minute to fulfil the acceptance rate.

18. A vehicle comprising:
  one or more processors configured to:
  determine a projected state of charge of a battery of the vehicle on at least one upcoming point along a planned route;
  determine a projected battery temperature of the battery at the at least one upcoming point;
  based on at least the state of charge and battery temperature, determine a charge acceptance rate for the battery at the at least one upcoming point;
  determine if the acceptance rate meets at least one predefined parameter for charging;
  responsive to the acceptance rate meeting the at least one predefined parameter, find at least one charging station within a predefined proximity to the at least one upcoming point for which one or more known charge provision characteristics allow the at least one predefined parameter to be met;
  display a location of the at least one charging station;
  determine that the vehicle is charging at one of the at least one charging stations;
  monitor the acceptance rate while the vehicle is charging; and
  automatically terminate charging if the acceptance rate falls below at least a first threshold.

* * * * *